US012795529B2

(12) United States Patent
Xiang

(10) Patent No.: US 12,795,529 B2
(45) Date of Patent: Nov. 10, 2026

(54) NETWORK DISCOVERY AND SELECTION OF ACCESSING LOCALIZED SERVICES

(71) Applicant: Huawei Technologies Co., Ltd., Shenzhen (CN)

(72) Inventor: Zhixian Xiang, Frisco, TX (US)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 197 days.

(21) Appl. No.: 18/591,977

(22) Filed: Feb. 29, 2024

(65) Prior Publication Data

US 2024/0205814 A1 Jun. 20, 2024

Related U.S. Application Data

(63) Continuation of application No. PCT/US2022/045922, filed on Oct. 6, 2022.

(60) Provisional application No. 63/256,209, filed on Oct. 15, 2021.

(51) Int. Cl.
*H04W 48/18* (2009.01)
*H04W 48/04* (2009.01)
*H04W 48/16* (2009.01)

(52) U.S. Cl.
CPC ........... *H04W 48/18* (2013.01); *H04W 48/04* (2013.01); *H04W 48/16* (2013.01)

(58) Field of Classification Search
CPC ...... H04W 48/18; H04W 48/04; H04W 48/16
See application file for complete search history.

(56) References Cited

U.S. PATENT DOCUMENTS

| | | | | |
|---|---|---|---|---|
| 12,302,239 | B2 * | 5/2025 | Wang | H04W 48/16 |
| 2015/0282042 | A1 | 10/2015 | Griot et al. | |
| 2019/0335392 | A1 | 10/2019 | Qiao et al. | |
| 2021/0345226 | A1 * | 11/2021 | Liao | H04W 48/18 |
| 2022/0086741 | A1 * | 3/2022 | Liao | G08G 5/26 |
| 2022/0256632 | A1 * | 8/2022 | Shrivastava | H04W 68/005 |
| 2023/0345355 | A1 * | 10/2023 | Talebi | H04W 40/02 |
| 2024/0205814 | A1 * | 6/2024 | Xiang | H04W 48/04 |

FOREIGN PATENT DOCUMENTS

| | | | | |
|---|---|---|---|---|
| AU | 2012304619 A1 * | 4/2014 | H04W 12/08 | |
| WO | WO-2021092441 A1 * | 5/2021 | H04L 67/10 | |

* cited by examiner

*Primary Examiner* — Michael J Moore, Jr.
(74) *Attorney, Agent, or Firm* — Slater Matsil, LLP

(57) ABSTRACT

According to embodiments, a UE receives from a base station of a network discovery information indicating one or more localized services that are accessible via the network. The UE obtains further detailed information about the one or more localized services. The UE determines to select the network based on the discovery information and the further detailed information and a preconfigured localized services and network selection policy. The UE connects to the network to access a localized service of the one or more localized services based on the discovery information, the further detailed information, and the preconfigured localized services and network selection policy.

17 Claims, 9 Drawing Sheets

NETWORK DISCOVERY AND SELECTION OF ACCESSING LOCALIZED SERVICES

CROSS-REFERENCE TO RELATED APPLICATIONS

This patent application is a continuation of International Patent Application No. PCT/US2022/045922 filed on Oct. 6, 2022 and entitled "Network Discovery and Selection of Accessing Localized Services," which claims priority to U.S. Provisional Application No. 63/256,209, filed on Oct. 15, 2021 and entitled "Mechanism for Network Service Advertisement for Network Discovery and Selection of Access Localized Services," applications of which are hereby incorporated by reference as if reproduced in their entireties.

TECHNICAL FIELD

This disclosure relates generally to telecommunications, and in particular embodiments, to techniques for network service discovery for network discovery and selection of access localized services.

BACKGROUND

With the 5th generation (5G) enabler technologies developed by the 3rd Generation Partnership Project (3GPP), such as private networks and network slicing, a new network deployment model is being considered in 3GPP release 18. In this network deployment model, a local network is dedicated to provide network access for some localized services, such as receiving immersive media streams for people while attending an entertainment show or sports game, or receiving some local information guidance and multimedia activities for people while visiting a tourist spot. The localized services may be only available for certain or all customers in a confined area during a period of time, and is operated by a network operator which may or may not have prior business agreement (arrangement) with the home operator of the user equipment (UE). The local network dedicated to provide network access for localized services may be a public-line-mobile network (PLMN) network, which may have dedicated slice(s) allocated for the localized services or a private network (e.g., a non-public-network (NPN)), which provides or hosts some localized services. The UEs which want to use a localized service need to access the dedicated local network in order to use the localized service provided by the dedicated local network.

SUMMARY

Technical advantages are generally achieved, by embodiments of this disclosure which describe methods and apparatuses for network discovery and selection of accessing localized services.

According to embodiments, a UE receives from a base station of a network discovery information indicating one or more localized services that are accessible via the network. The UE obtains further detailed information about the one or more localized services. The UE determines to select the network based on the discovery information and the further detailed information and a preconfigured localized services and network selection policy. The UE connects to the network to access a localized service of the one or more localized services based on the discovery information, the further detailed information, and the preconfigured localized services and network selection policy.

In some embodiments, the UE may select the localized service based on one of a manual selection by a user of the UE or a matching of the localized service in the preconfigured localized services and network selection policy. The UE may perform an access procedure based on the selecting.

In some embodiments, the discovery information may be broadcasted in a system information block (SIB) message. The discovery information may further indicate. that the network supports providing accessing to the one or more localized services.

In some embodiments, the discovery information may be broadcasted in a SIB message. The discovery information may further indicate that the network supports on-demand access request from the UE, which or a home operator of which has no prior business relationship with the network.

In some embodiments, the discovery information may further indicate a broadcast interval to be monitored for UE to receive the further detailed information about the one or more localized services.

In some embodiments, the UE may obtain the further detailed information by monitoring during the broadcast interval to receive the further detailed information about the one or more localized services in a second SIB message based on a user input or the preconfigured localized services and network selection policy.

In some embodiments, the discovery information may further indicate that the network supports querying of the further detailed information and a query type. The query type may be one of querying with a RAN of the network, querying with a core network function of the network, or querying with an application function (AF) of a second network different from the network. The UE may obtain the further detailed information by performing, with the network, a query requesting the further detailed information about the one or more localized services and receiving a query response indicating the further detailed information about the one or more localized services.

In some embodiments, the core network function may include an access management function (AMF).

In some embodiments, the discovery information may further indicate that the network supports querying of the further detailed information and the query type broadcasted in a SIB message.

In some embodiments, the query type may be one of the querying with the RAN of the network or the querying with the core network function of the network. The UE may perform the query by transmitting the query to the RAN or an AMF via the base station.

In some embodiments, the querying with the RAN being carried out via the RAN signaling and SIB messages.

In some embodiments, the query type may be the querying with the AF of the second network. The discovery information may further indicate a server address of the AF. The UE may perform the query by transmitting the query to the AF based on the server address.

In some embodiments, the discovery information may further indicate the server address of the AF broadcasted in a SIB message, or provided to UE via a user parameter update (UPU) procedure or a user configuration update (UCU) procedure, or a policy update procedure.

In some embodiments, the AF may be an application level function that provides localized service information including a service portal.

In some embodiments, the further detailed information may include at least one of a service type of the localized service, a service name, or a service identity of the localized service. The further detailed information may further include a valid condition for accessing the localized service and the network.

In some embodiments, the valid condition for accessing the localized service and the network may include at least one of a location restriction, a time of operation, an operation time period, a moving speed, or a signaling strength.

In some embodiments, the discovery information may further include human readable information. The human readable information may be compressed or represented by pre-agreed coding translated by the UE and presented to a user of the UE.

In some embodiments, the discovery information may further include a list of localized service provider identities or a service operator group identity representing a set of service providers having business agreements with one another.

In some embodiments, the discovery information may further include a list of localized service identities or a service group identity representing the one or more localized services.

In some embodiments, the preconfigured localized services and network selection policy may be provisioned by a home network of the UE or by a localized service provider via a UPU procedure, a UCU procedure, or a policy update procedure.

In some embodiments, the network may be operated by a hosting network operator different from a home operator of the UE.

According to embodiments, a first network device in a network visited by a UE transmits to the UE discovery information indicating one or more localized services that are accessible via the network. A second network device provides to the UE further detailed information about the one or more localized services. The first network device connects with the UE to the network to access a localized service of the one or more localized services based on the discovery information, the further detailed information, and a preconfigured localized services and network selection policy.

In some embodiments, the first network device may be a base station, and the second network device may be another network function device different from the base station. The second network device may provide access management. The second network device may be an access management function (AMF) or an application function (AF).

In some embodiments, the first network device and the second network device may be a same base station.

In some embodiments, the localized service may be selected based on one of a manual selection by a user of the UE or a matching of the localized service in the preconfigured localized services and network selection policy. The first network device and the second network device may perform an access procedure with the UE based on the localized service selected.

In some embodiments, the discovery information may be broadcasted in a system information block (SIB) message. The discovery information may further indicate that the network supports providing accessing to the one or more localized services.

In some embodiments, the discovery information may be broadcasted in a SIB message. The discovery information may further indicate that the network supports on-demand access request from the UE, which or a home operator of which has no prior business relationship with the network.

In some embodiments, the discovery information may further indicate a broadcast interval to be monitored for UE to receive the further detailed information about the one or more localized services.

In some embodiments, the providing the detailed information may include broadcasting, by the first network device during the broadcast interval, the further detailed information about the one or more localized services in a second SIB message based on a UE input or the preconfigured localized services and network selection policy.

In some embodiments, the discovery information may further indicate that the network supports querying of the further detailed information and a query type, the query type being one of querying with a RAN of the network, querying with a core network function of the network, or querying with an AF of a second network different from the network. The providing the detailed information may include receiving, by the first network device from the UE, a query requesting the further detailed information about the one or more localized services and transmitting, by the second network device to the UE, a query response indicating the further detailed information about the one or more localized services.

In some embodiments, the core network function may include an AMF.

In some embodiments, the discovery information may further indicate that the network supports querying of the further detailed information and the query type broadcasted in a SIB message.

In some embodiments, the query type may be one of the querying with the RAN of the network or the querying with the core network function of the network. The first network device may forward the query to the RAN or an AMF.

In some embodiments, the querying with the RAN may be carried out via the RAN signaling and SIB messages.

In some embodiments, the query type may be the querying with the AF of the second network. The discovery information may further indicate a server address of the AF. The UE may transmit the query to the AF based on the server address.

In some embodiments, the discovery information may further indicate the server address of the AF broadcasted in a SIB message, or provided to UE via a user parameter update (UPU) procedure or a user configuration update (UCU) procedure, or a policy update procedure.

In some embodiments, the AF may be an application level function that provides localized service information including a service portal.

In some embodiments, the further detailed information may include at least one of a service type of the localized service, a service name, or a service identity of the localized service. The further detailed information may further include a valid condition for accessing the localized service and the network.

In some embodiments, the valid condition for accessing the localized service and the network may include at least one of a location restriction, a time of operation, an operation time period, a moving speed, or a signaling strength.

In some embodiments, the discovery information may further include human readable information. The human readable information may be compressed or represented by pre-agreed coding translated by the UE and presented to a user of the UE.

In some embodiments, the discovery information may further include a list of localized service identities or a service group identity representing the one or more localized services.

In some embodiments, the preconfigured localized services and network selection policy may be provisioned by a home network of the UE or by a localized service provider via a UPU procedure, a UCU procedure, or a policy update procedure.

In some embodiments, the network may be operated by a hosting network operator different from a home operator of the UE.

BRIEF DESCRIPTION OF THE DRAWINGS

For a more complete understanding of the present disclosure, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

The making and using of embodiments of this disclosure are discussed in detail below. It should be appreciated, however, that the concepts disclosed herein can be embodied in a wide variety of specific contexts, and that the specific embodiments discussed herein are merely illustrative and do not serve to limit the scope of the claims. Further, it should be understood that various changes, substitutions and alterations can be made herein without departing from the spirit and scope of this disclosure as defined by the appended claims.

Figure 1A:
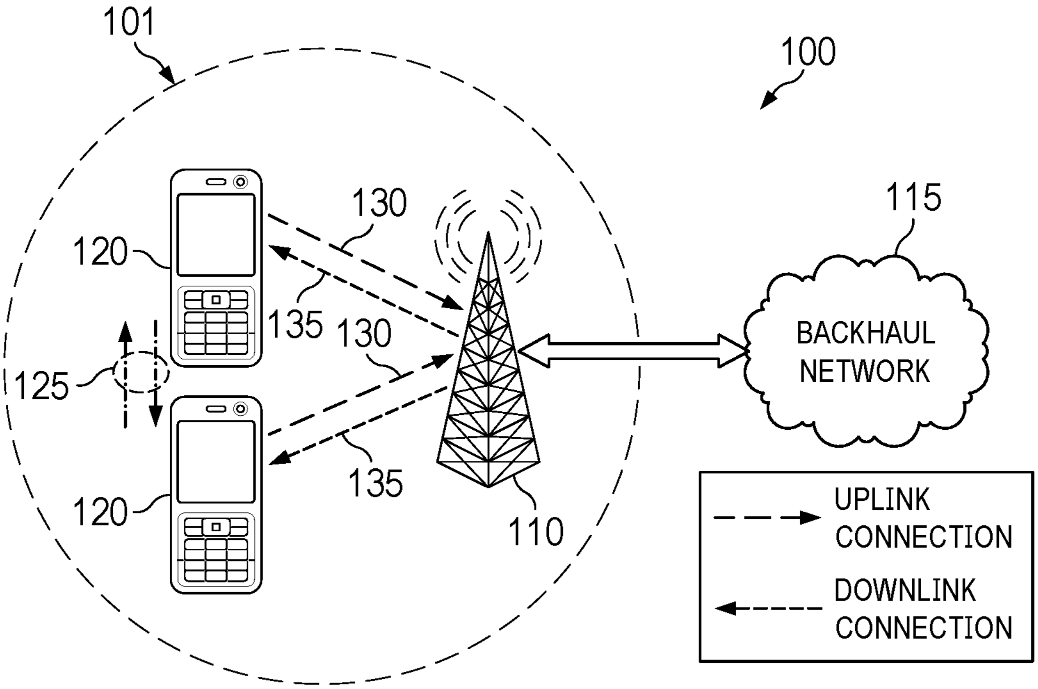
FIG. 1A illustrates a diagram of an embodiment wireless communications network.

FIG. 1A illustrates an example communications system 100. Communications system 100 includes an access node 110 serving user equipments (UEs) with coverage 101, such as UEs 120. In a first operating mode, communications to and from a UE passes through access node 110 with a coverage area 101. The access node 110 is connected to a backhaul network 115 for connecting to the internet, operations and management, and so forth. In a second operating mode, communications to and from a UE do not pass through access node 110, however, access node 110 typically allocates resources used by the UE to communicate when specific conditions are met. Communications between a pair of UEs 120 can use a sidelink connection (shown as two separate one-way connections 125). In FIG. 1A, the sideline communication is occurring between two UEs operating inside of coverage area 101. However, sidelink communications, in general, can occur when UEs 120 are both outside coverage area 101, both inside coverage area 101, or one inside and the other outside coverage area 101. Communication between a UE and access node pair occur over uni-directional communication links, where the communication links between the UE and the access node are referred to as uplinks 130, and the communication links between the access node and UE is referred to as downlinks 135.

Access nodes may also be commonly referred to as Node Bs, evolved Node Bs (eNBs), next generation (NG) Node Bs (gNBs), master eNBs (MeNBs), secondary eNBs (SeNBs), master gNBs (MgNBs), secondary gNBs (SgNBs), network controllers, control nodes, base stations, access points, transmission points (TPs), transmission-reception points (TRPs), cells, carriers, macro cells, femtocells, pico cells, and so on, while UEs may also be commonly referred to as mobile stations, mobiles, terminals, users, subscribers, stations, and the like. Access nodes may provide wireless access in accordance with one or more wireless communication protocols, e.g., the Third Generation Partnership Project (3GPP) long term evolution (LTE), LTE advanced (LTE-A), 5G, 5G LTE, 5G NR, sixth generation (6G), High Speed Packet Access (HSPA), the IEEE 802.11 family of standards, such as 802.11a/b/g/n/ac/ad/ax/ay/be, etc. While it is understood that communications systems may employ multiple access nodes capable of communicating with a number of UEs, only one access node and two UEs are illustrated for simplicity.

With the 5G enabler technologies developed by the 3GPP, such as private networks and network slicing, a new network deployment model is being considered in 3GPP release 18. In this network deployment model, a local network is dedicated to provide network access for some localized services, such as receiving immersive media streams for people while attending an entertainment show or sports game, or receiving some local information guidance and multimedia activities for people while visiting a tourist spot. The localized services may be only available for certain or all customers in a confined area during a period of time, and is operated by a network operator which may or may not have prior business agreement (arrangement) with the home operator of the UE. The local network dedicated to provide network access for localized services may be a PLMN network, which may have dedicated slice(s) allocated for the localized services or a private network (e.g., a NPN), which provides or hosts some localized services. The UEs which want to use a localized service need to access the dedicated local network in order to use the localized service provided by the dedicated local network.

Figure 1B:
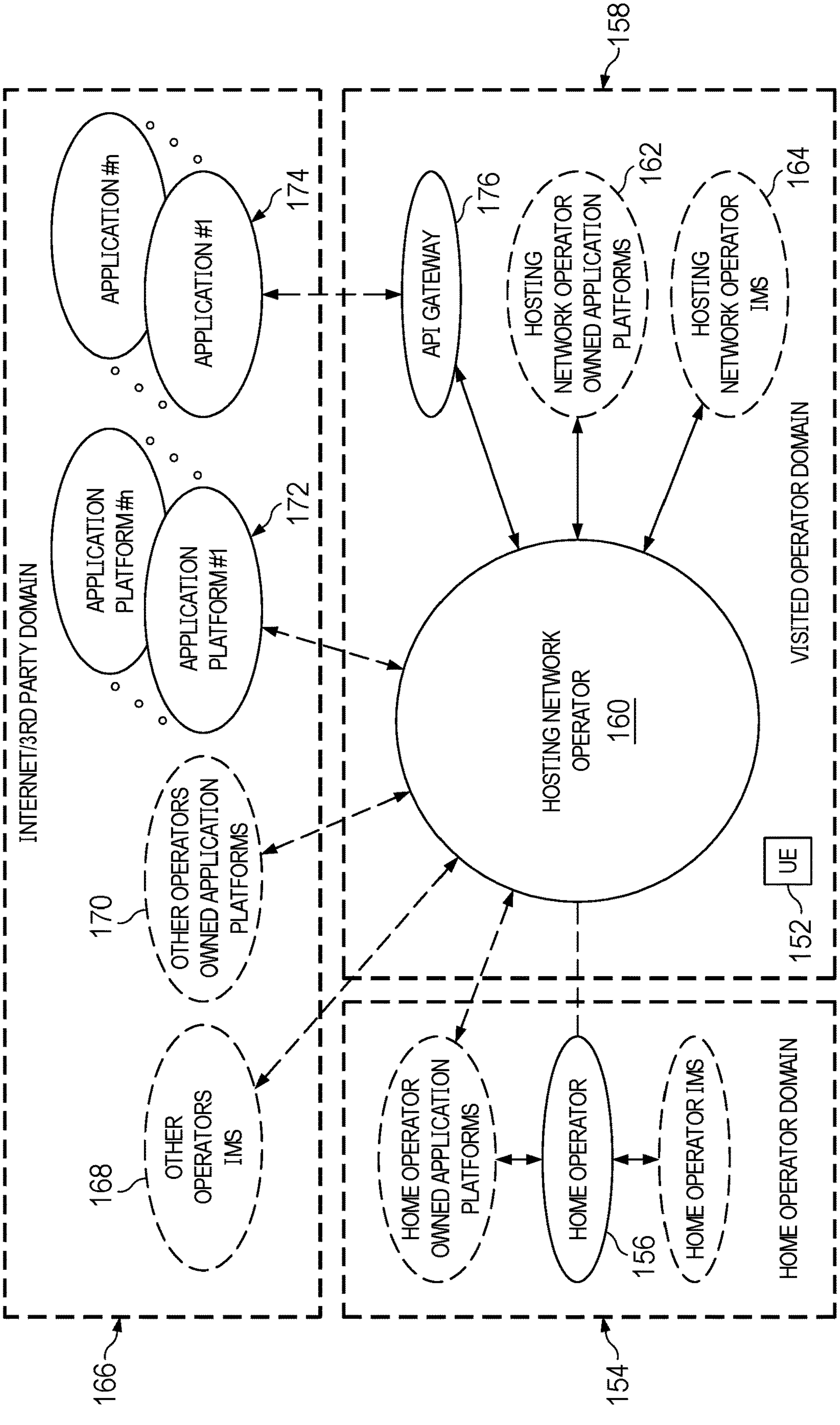
FIG. 1B (PRIOR ART)
FIG. 1B illustrates an example of a dedicated local network and its relationship with a UE, the home network of the UE, and localized services, according to some embodiments.

FIG. 1B illustrates an example of a dedicated local network and its relationship with a UE, the home network of the UE, and localized services according to some embodiments. FIG. 1B is based on 3GPP TR22.844 Figure A-2. The UE 152 may be served by the home network 154 of the UE in the home operator domain operated by the UE's home operator 156. The UE 152 may move to an area covered by a local network 158 in a visited operator domain operated by a hosting network operator 160. The local network 158 may potentially provide network access for the UE 152 for localized services described above. The localized services may be provided by the hosting operator owned application platforms 162 or the hosting operator IP multimedia subsystem (IMS) 164. The localized services may be from the Internet or a third party domain 166, provided by other operator's IMS 168, other operator's owned application platforms 170, application platforms 172, or applications 174 (via the application programming interface (API) gateway 176 in the visited operator domain). In this disclosure, unless otherwise specified, the local network providing the localized service(s) may also be referred to the visited local network for the UE.

The existing 4-th generation (4G) or 5G standard defined by 3GPP does not have the capabilities to allow a UE to discover and select of the local network (e.g., local network 158) and the localized services that the local network provides, especially when the UE does not have prior knowledge of the local network and the localized service that the local network provides.

The UE does not have prior knowledge of the local network because the local network for localized services may be unknown to the UE or the home network of the UE before the UE enters the coverage area of the local network. So, the UE may be prevented from discovering the localized services provided by the local network. Therefore, there is a need for the local network to advertise (e.g., broadcast) the localized services that the local network provides to UEs, in order to allow the local network to be discoverable and to be selected. The existing network discovery and selection mechanism defined by the 3GPP standard is not service oriented. The UE only discovers and selects the network based on the preconfigured preferred network list. A new solution is also desired to allow the user of the UE to manually discover and select the network.

Also, the existing standardized network information broadcasted by the local network for UE to discover and select the network neither indicates any over-the-top services it provides, nor provides human readable information which may be used by the user of the UE to make a selection. So, there is no way for UE to know what kind of localized services the local network is providing.

The UE does not have prior knowledge of the local network also because the local network providing or hosting the localized service may not have a prior business contract with the UE or the home network of the UE. Based on the existing standard, if the local network has no prior business relationship, the UE would not select the local network. But for the use case of localized services, the local network may be open for the on-demand connection without any prior business contract.

This provides technical embodiments for local network service discovery that the local network, which provides the localized services, may broadcast a set of information which includes indications about the localized service(s) including service type, ID, whether the local network supports service query, manual selection, service valid period, and so on. The UE may use the information to conduct network discovery, selection to get access to the local network, and the localized service(s) that the local network provides.

In some embodiments, a localized service may be only available within a limited span of time and physical extent, and provided by operator(s) (e.g., brick and mortar businesses, entertainment venues, construction contractors, first responder agencies, etc.) for particular area(s). The examples of the localized services may be immersive AR/VR experience in a concert or a game, immersive shopping experience in a shopping mall, virtual tour guide service, and so on. The localized services may be application layer services. Several non-limiting deployment examples of localized services provided by a local network are provided below.

In one example, Tom is traveling abroad. He configured his phone to automatically discover and select a local network which hosts service(s) providing interactive touring guide services. When he arrives in city A which is covered by local networks X and Y, local network X broadcasts discovery information that it offers the interactive guide service for visitors. Local network Y does not offer such service. Tom's UE receives the discovery information from local network X, and connects to local network X to access the guide service that the local network X provides.

In another example, Tom is traveling abroad. He configured his phone to discover all the local networks that provide localized services for him to select manually. When he arrives in city A which is covered by local networks X and Y, local network X broadcasts discovery information that it offers some interactive guiding service for visitors. Local network Y does not offer any localized service. Tom's UE receives the discovery information from local network X and presents the discovery information to Tom. Tom can then manually decide whether he wants to access local network X or not.

In yet another example, Stadium A hosts a football game tonight. Stadium A provides various immersive applications to the audience via Stadium's private local network X. Local network X is configured to provide different types of services via their own network slices and authentication mechanisms. Local network X broadcasts localized service information to allow all the audience know there are local applications via the private local network X. Local network X also broadcasts information to indicate that it supports UE to conduct further query on detailed information via the application server hosted in the local network X. Jack is interested in the real time augmented reality (AR) application for his AR glasses. So Jack uses his phone to further query local network X with the application server's IP address the network provides to collect the information regarding that AR application and configure the phone accordingly.

This disclosure provides embodiments for the local network to broadcast information about localized services.

The radio access network (RAN) of a local network broadcasts discovery information to indicate that the local network provides access to one or more localized services. The discovery information may be received by all the UEs within the coverage area of the RAN of the local network. The discovery information may be broadcasted via the SIB message from the gNB or query procedure such as via the Internet.

The discovery information may indicate that the local network supports or provides accessing to one or more localized services. The discovery information may also indicate that the access network may broadcast other information of the one or more localized services for the UE to receive at a later time if the UE is interested in accessing the localized services. The UE supporting localized service capability to receive the discovery information can use the discovery information for further localized service discovery and network selection. For example, if the UE is configured a policy to discover localized services, when it receives the discovery information, the UE may active its network discovery and selection procedure to collect the localized service information and conduct further actions based on the policy with that information.

The discovery information may indicate whether the local network supports individual UEs to send query request to collect more detailed information of the localized service(s) from the local network. So, instead of the local network broadcasting all the localized service information which may consume too much radio resources. With the information indicating whether the local network supports querying, the local network may provide the detailed localized service information via the query/response procedure based on the query request sent from the UEs. If a UE supports query capability, the UE may start a query procedure with the local network to collect further detailed information of the localized service(s).

The discovery information may also indicate the supported localized service query types by the local network, including:

- UE querying with the RAN (via access stratum (AS) message),
- UE querying with the access management function (AMF) (via the non-access stratum (NAS) message), or
- UE querying with the localized service server that provides the localized service (e.g. the localized service application function (AF)). If the local network supports UE querying with the localized service server, the localized server IP address or domain name may be broadcasted in the discovert information. The localized service server may be a localized service AF.

The discovery information may indicate whether the local network supports on-demand access request from a UE, where neither the UE nor the UE's home operator has prior business relationship with the local network. With the discovery information, the user of the UE who is interested in the localized service(s) can use on-demand authentication and authorization procedure to access the localized network and access the localized service(s) via the localized network.

The detailed information about the localized service(s) provided by or accessed via this local network may be received by the UE following the discovery information. The detailed information may include a list of service type(s) of the localized service(s). A service type may be defined as a human readable text, a standardized service category information element within a system information block (SIB) message, or other control messages between the UE and the network with the fixed bit length. Each bit in the information element represents a service type provided by the local network. Table 1 below shows one example embodiment of the service category map.

TABLE 1

| Bit 1 | Bit 2 | Bit 3 | Bit 4 | Bit 5 | Bit 6 | Bit 7 |
|---|---|---|---|---|---|---|
| Connection service | Gaming | shopping | Video | IoT | Audio | Multimedia |

The detailed information may further include a list of the service group ID(s). Each group ID may represent a group of services. For each group, the service(s) and bit map may be different.

The detailed information may further include a list of localized service provider ID(s) or group ID(s).

The detailed information may further include a list of service ID(s). A service ID may include a service or application ID and/or service type indication. The application ID may be the same application ID defined by 3GPP.

The detailed information may further include a list of human readable service name(s) corresponding to the localized service(s) supported by the local network.

The detailed information may further include validity information of the localized service(s). The validity information of a localized service may include a time period, location restriction, and/or other condition(s) of using the localized service.

The discovery information may be used to indicate whether the local network will broadcast detailed information of the localized service(s) above periodically. The discovery information may also include the periodic interval of the detailed information of the localized service(s), or the expected waiting time after the UE receiving the discovery information. With such information, the UE may plan the right time to receive that the detailed information of the localized service(s).

The localized service information (e.g., the discovery information and/or the detailed information) may be preconfigured in the RAN of the local network via the operation, administration, and management (OAM) of the local network, or forwarded via the N2 interface from the AMF of the network.

The localized service information (e.g., the discovery information and/or the detailed information) may also be stored in the localized service AF, which can be queried and accessed by the UE(s) via the Internet. The localized service AF function's name and/or IP address may be provided to UE via the user parameter update (UPU) procedure, or the user configuration update (UCU) procedure, or the policy update procedure.

The localized service information (e.g., the discovery information and/or the detailed information) may be used by UE or the home network provider of the UE to configure the network discovery and selection policy to be stored in the UE.

The human readable information (e.g., human readable service name(s) corresponding to the localized service(s)) may be compressed or represented by some pre-agreed coding, which may be converted by the UE and presented to the user as human readable information.

The localized service information (e.g., the discovery information and/or the detailed information) described above may also be broadcasted via device-to-device communication by other UEs, which are connecting to the local network, by enhancing the control messages exchanged through the PC5 interface defined in the 3GPP. Therefore, the UE may also receive the information from other UE(s) regarding the local network and its localized service(s) provided by or accessible via the local network.

Figure 2:
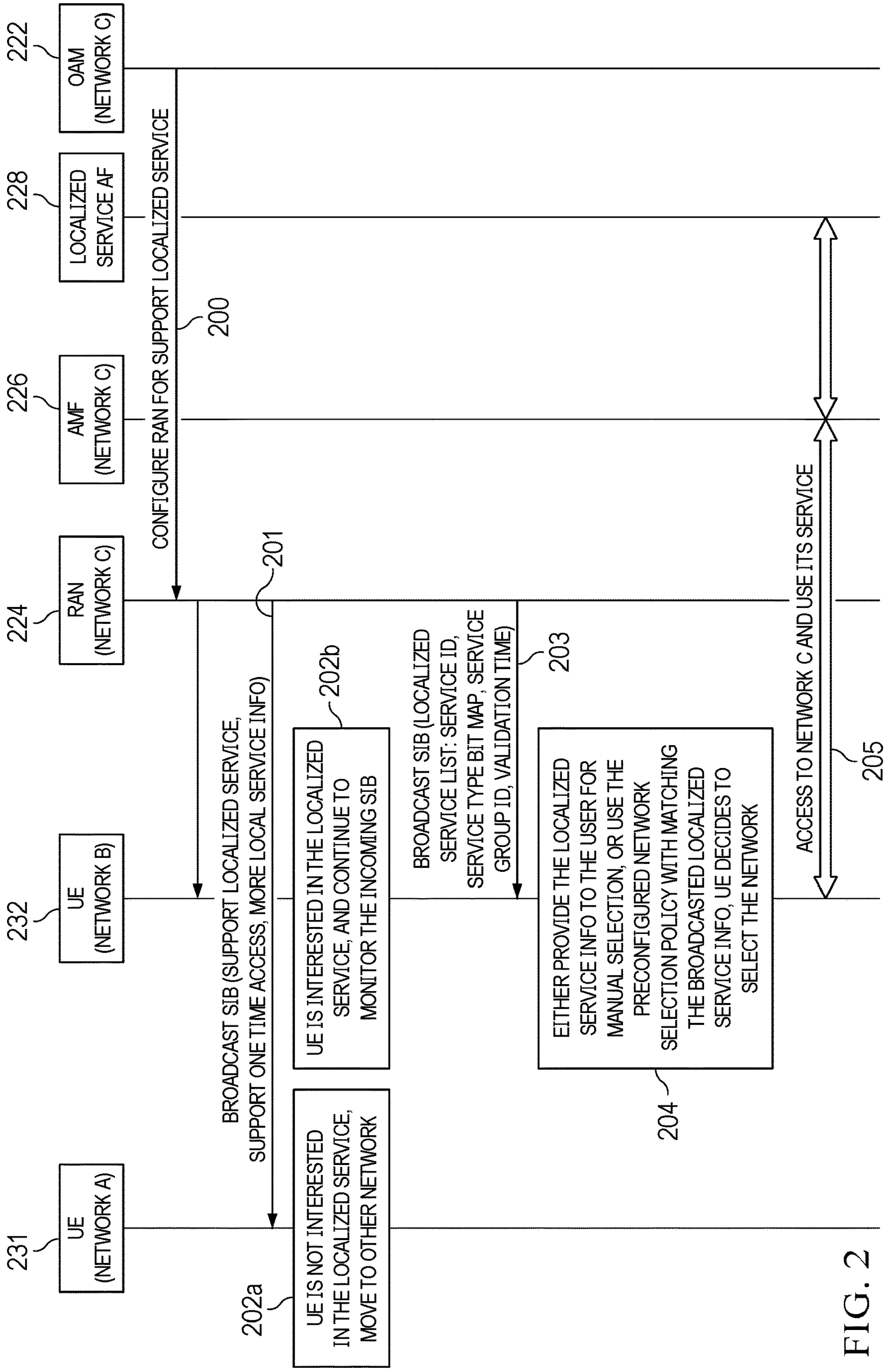
FIG. 2 illustrates an example message flow of the UE using the RAN to broadcast localized service information for network selection, according to some embodiments.

FIG. 2 illustrates an example message flow of the UE using the RAN to broadcast localized service information for network selection, according to some embodiments. At operation 200, the OAM system 222 of the local network (network C) sends a configuration message to the RAN 224 of the local network to configure the RAN 224 to support localized services. In this disclosure, the operations performed by a RAN may be performed by one or more base stations in the RAN. The configuration message configures the RAN 224 to broadcast the localized service information. The configuration message may also include localized service information (e.g., the discovery information and/or the detailed information) described above.

At operation 201, the RAN 224 broadcasts the discovery information about the localized service(s) in a SIB message within the coverage area of the RAN 224. The SIB message may include information about localized service(s) that the local network (network C) supports. For example, the discovery information in the SIB message may indicate at least one of the following:

- indication of the local network supporting and providing localized service(s);
- indication of the local network supporting one-time access without prior subscription; and/or
- indication of the broadcast interval of detailed information (such as service type or name). This indication would allow the UE to wait and listen for the detailed information if the UE is interested; and/or
- other useful localized service indication.

The UE 231 is visiting the coverage area of the RAN 224. The home network of the UE 231 is the network A, which may be operated by a different operator than the local network C's operator. At operation 202*a*, the UE 231 is not interested in the localized service(s) provided by the local network C. Also, the local network C is not in the UE 231's preferred network list. So, the UE 231 will not monitor the broadcast information from the RAN 224 of the local network C.

The UE 232 is visiting the coverage area of the RAN 224. The home network of the UE 232 is the network B, which may be operated by a different operator than the local network C's operator. At operation 202*b*, the UE 232 is interested in the localized service(s) provided by the local network C based on the user input or based on a pre-configured policy. After receiving the SIB message, the UE 232 continues to monitor the RAN 224 and waits for receiving the further detailed information, such localized service type or name.

At operation 203, the broadcast interval indicated at operation 201 is up, the RAN 224 broadcasts another SIB message including more detailed information of the localized service(s). The detailed information may include at least one of the following:

- a list of localized service(s) provided by the local network C, including the service type ID or name (which may be human readable text);
- service type bit map;
- service group ID; or
- a valid time for each service.

At operation 204, after receiving the detailed information about the localized service(s) from the RAN 224, based on the pre-configured UE policy, the UE 232 may either present the detailed information (if the service ID, service type, and/or the service name are human readable, or such information can be converted into human readable information) to the user interface (UI) for the user of the UE 232 to make a decision/selection. Or, the UE 232 may use the pre-configured network selection policy corresponding to the detailed information from local network C and automatically select the local network C for network access if there is match between the pre-configured network selection policy and the detailed information.

At operation 205, if the UE 232 decides to access the local network C for a localized service that the local network C provides, the UE 232 may start the normal network access process with the RAN 224 (e.g., performing a random access procedure to access the RAN 224). After the access process, the UE may access the localized service via the RAN 224 through at least one of the AMF 226 of the network C and/or the localized service AF 228. The local service AF 228 may be outside the local network C and operated by a different operator than the operator of the local network C.

In FIG. 2, the AMF 226 may be part of the core network function of the local network C and may run on one or more network nodes in the local network C. The OAM 222 may run on one or more network nodes in the local network C. The AMF 226 and the OAM 222 may run on the same or different network node(s). The localized service AF 228 may run on one or more network nodes in another network different from and outside the local network C and operated by a different operator than the operator of the local network C.

Figure 3:
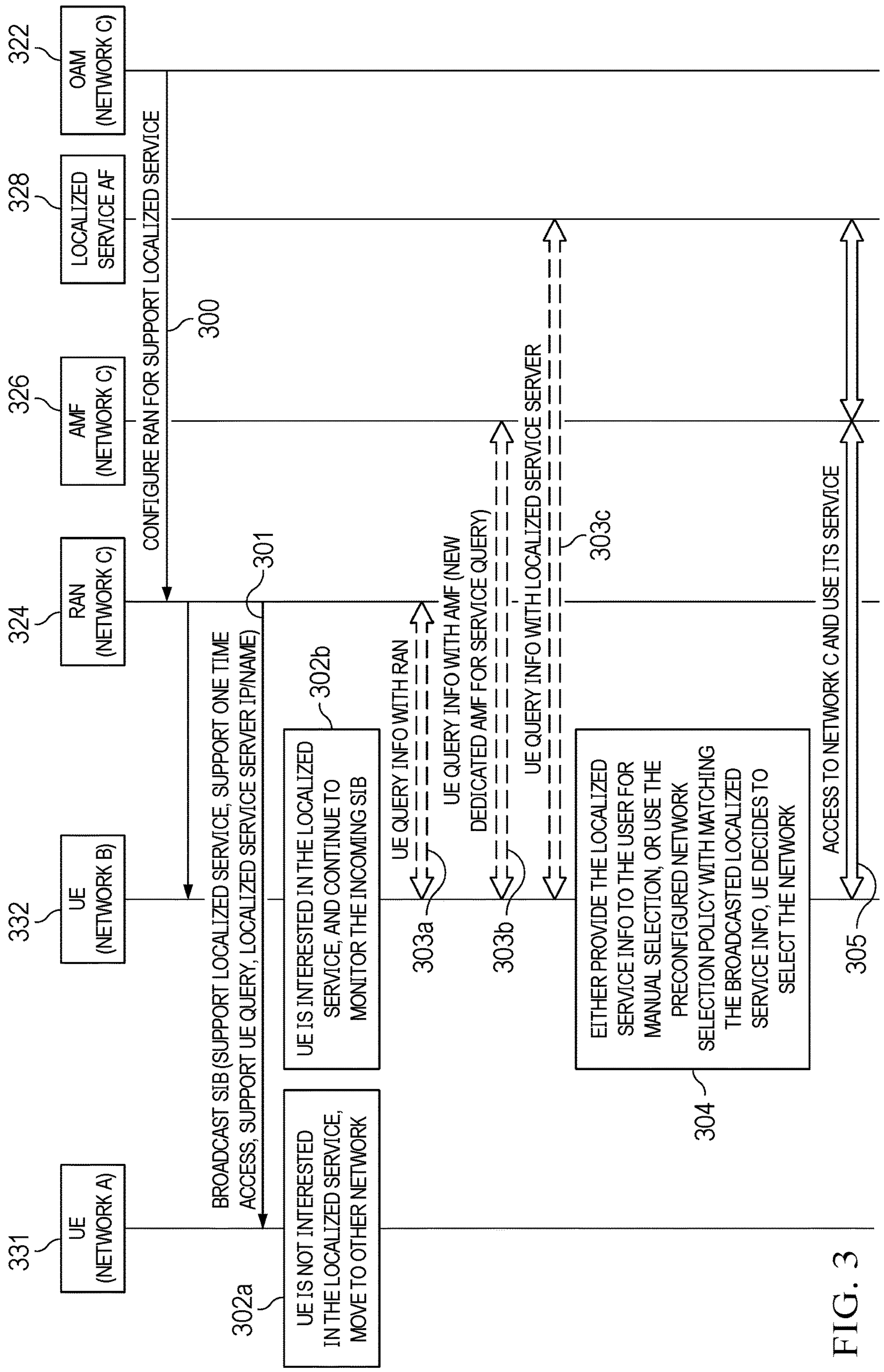
FIG. 3 illustrates an example message flow of the UE querying further detailed information about the localized service(s) from the local network, according to some embodiments.

FIG. 3 illustrates an example message flow of the UE querying further detailed information about the localized service(s) from the local network, according to some embodiments. At operation 300, the OAM system 322 of the local network (network C) sends a configuration message to the RAN 324 of the local network to configure the RAN to support localized services. The configuration message configures the RAN 324 to broadcast the localized service information. The configuration message may also include localized service information (e.g., the discovery information and/or the detailed information) described above.

At operation 301, the RAN 324 broadcasts the discovery information about the localized service(s) in a SIB message within the coverage area of the RAN 324. The SIB message may include information about localized service(s) that the local network (network C) supports. For example, the discovery information in the SIB message may indicate at least one of the following:

- indication of the local network supporting and providing localized service(s);
- indication of the local network supporting one-time access without prior subscription;
- indication of the local network supporting UE query for further detailed information about the localized service(s) provided by the local network C;
- indication of the query type, such as querying with the RAN 324 (via the AS message), querying with the AMF 326 (via the NAS message), or querying with an IP server (e.g., the localized service AF 328);
- the localized service server 328's IP address or domain name in case the UE needs to interact with that the localized server for querying via the Internet; and/or
- other useful localized service indication.

The UE 331 is visiting the coverage area of the RAN 324. The home network of the UE 331 is the network A, which may be operated by a different operator than the local network C's operator. At operation 302*a*, the UE 331 is not interested in the localized service(s) provided by the local network C. Also, the local network C is not in the UE 331's preferred network list. So, the UE 331 will not monitor the broadcast information from the RAN 324 of the local network C or query for further detailed information.

The UE 332 is visiting the coverage area of the RAN 324. The home network of the UE 332 is the network B, which may be operated by a different operator than the local network C's operator. At operation 302*b*, the UE 332 is interested in the localized service(s) provided by the local network C based on the user input or based on a pre-configured policy. After receiving the SIB message, the UE 332 decides to query more detailed information about the localized service(s) from the local network C before making the decision to access the network C.

If the indication of the query type in the SIB message is querying with the RAN, at operation 303*a*, the UE 332 may query the detailed information about the localized service(s) by sending the query request to the RAN 324, which is configured with localized service information including the detailed information about the localized service(s).

If the indication of the query type in the SIB message is querying with the AMF, at operation 303*b*, the UE 332 may query the detailed information about the localized service(s) by sending the query request to the dedicated AMF 328 of the local network C.

If the indication of the query type in the SIB message is querying with the localized service server, at operation 303*c*, the UE 332 may use its existing IP connection via another network to connect to the localized service server 328 to send the query request for querying the detailed information about the localized service(s).

After sending the query request, the UE 332 may receive a query response from the RAN 324, the AMF 326, or the localized service server 328. The query response may include the same or similar detailed information about the localized service(s) as described with respect to operation 203 in FIG. 2.

At operation 304, after receiving the detailed information about the localized service(s), based on the pre-configured UE policy, the UE 332 may either present the detailed information (if the service ID, service type, and/or the service name are human readable, or such information can be converted into human readable information) to the user interface (UI) for the user of the UE 332 to make a decision/selection. Or, the UE 332 may use the pre-configured network selection policy corresponding to the detailed information from local network C and automatically select the local network C for network access if there is match between the pre-configured network selection policy and the detailed information.

At operation 305, if the UE 332 decides to access the local network C for a localized service that the local network C provides, the UE 332 may start the normal network access process with the RAN 324 (e.g., performing a random access procedure to access the RAN 324). After the access process, the UE may access the localized service via the RAN 324 through at least one of the AMF 326 of the network C and/or the localized service AF 328. The local service AF 328 may be outside the local network C and operated by a different operator than the operator of the local network C.

In FIG. 3, the AMF 326 may be part of the core network function of the local network C and may run on one or more network nodes in the local network C. The OAM 322 may run on one or more network nodes in the local network C. The AMF 326 and the OAM 322 may run on the same or different network node(s). The localized service AF 328 may run on one or more network nodes in another network different from and outside the local network C and operated by a different operator than the operator of the local network C.

Figure 4:
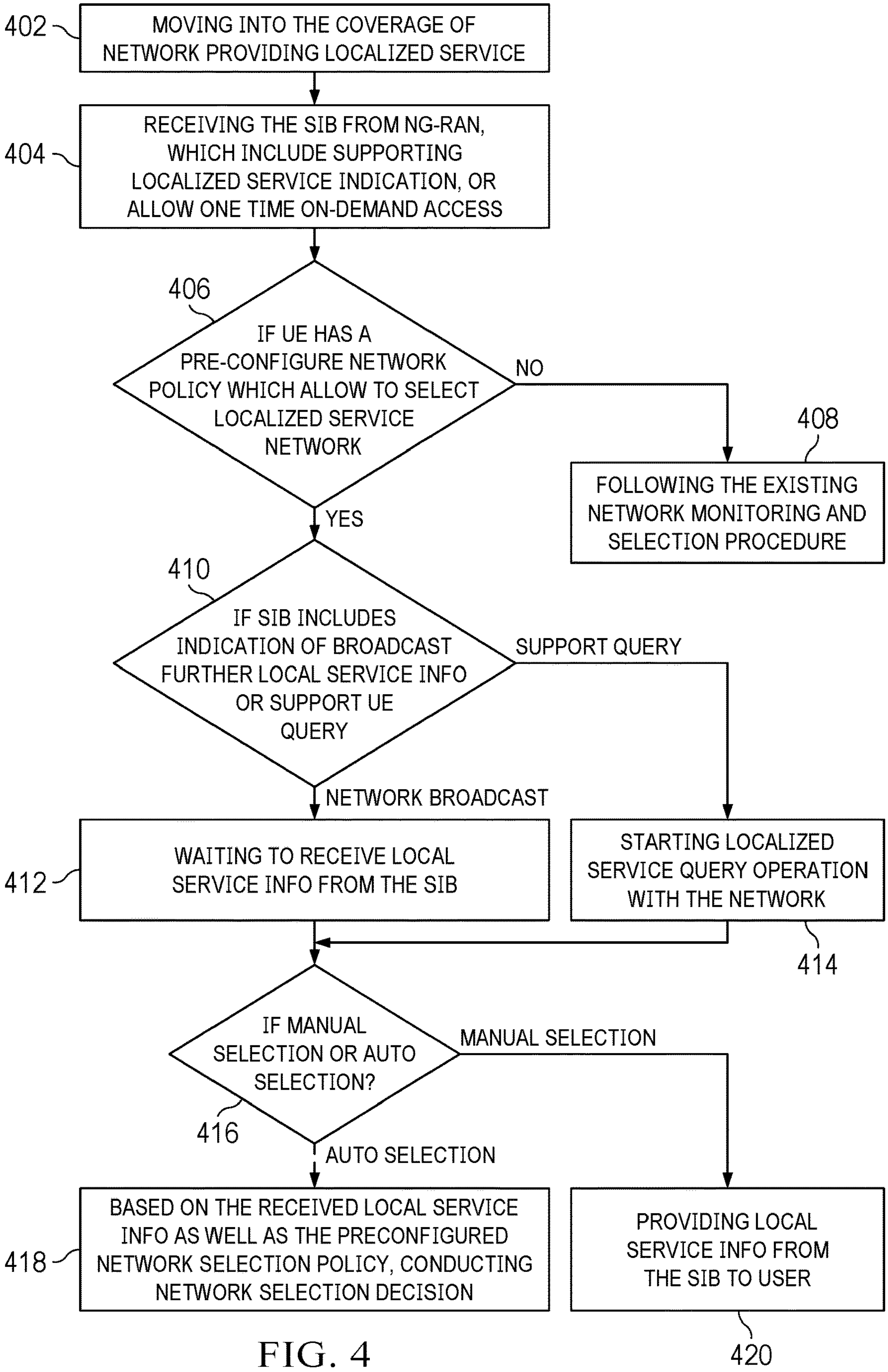
FIG. 4 illustrates a UE procedure for localized service network discovery and selection, according to some embodiments.

FIG. 4 illustrates a UE procedure for localized service network discovery and selection, according to some embodiments. At operation 402, the UE visits and moves into the coverage area of a local network providing localized service(s). At operation 404, the UE receives a SIB message from the RAN (e.g., an NG-RAN). The SIB message may include information as described with respect to operation 201 in FIG. 2, or operation 301 in FIG. 3. At operation 406, the UE determines whether the UE has a pre-configured network policy which allows the UE to select the local network provided the localized service(s). If the UE does not have such pre-configured network policy, at operation 408, the UE follows the existing current network monitoring and selection procedure.

If the UE has such pre-configured network policy, at operation 410, the UE determines whether the SIB message includes indication of supporting broadcasting further detailed information about the localized service(s) or supporting UE query.

If broadcasting further detailed information is support, at operation 412, the UE waits to receive the detailed information from another SIB, as described with respect to operation 203 in FIG. 2. Otherwise, if UE query is supported, at operation 414, the UE starts to query for more detailed information about the localized service(s) as described with respect to operations 303*a*/303*b*/303*c* in FIG. 3.

Following either operation 412 or operation 414, at operation 416, the UE determines whether the UE is configured with manual network selection or automatic network selection. If automatic network selection is configured for the UE, at operation 418, the UE may automatically select the local network for network access based on the received detailed information and the pre-configured network selection policy. If manual network selection is configured for the UE, at operation 420, the UE may provide the local service information to the user for the user to make a network selection decision.

Figure 5A:
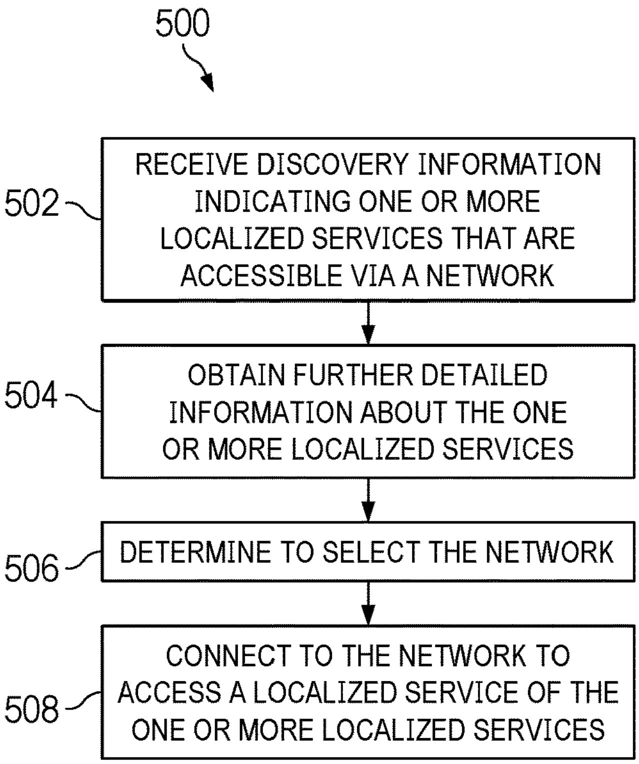
FIG. 5A illustrates a flow chart of a method for discovery and selection localized service(s), according to some embodiments.

FIG. 5A illustrates a flow chart of a method 500 for discovery and selection localized service(s), according to some embodiments. The method 500 may be carried out or performed by a UE visiting a local network. The method 500 may be carried out or performed by routines, subroutines, or modules of software executed by one or more processing units. The method 500 may further be carried out or performed by hardware, software, or a combination of hardware and software. Coding of the software for carrying out or performing the method 500 is well within the scope of a person of ordinary skill in the art having regard to the present disclosure. The method 500 may include additional or fewer operations than those shown and described and may be carried out or performed in a different order. Computer-readable code or instructions of the software executable by the one or more processing units may be stored on a non-transitory computer-readable medium, such as for example, the memory of the UE.

The method 500 starts at operation 502, where the UE receives from a base station of a network discovery information indicating one or more localized services that are accessible via the network. At operation 504, the UE obtains further detailed information about the one or more localized services. At operation 506, the UE determines to select the network based on the discovery information and the further detailed information and a preconfigured localized services and network selection policy. At operation 508, the UE connects to the network to access a localized service of the one or more localized services based on the discovery information, the further detailed information, and the pre-configured localized services and network selection policy.

In some embodiments, the UE may select the localized service based on one of a manual selection by a user of the UE or a matching of the localized service in the preconfigured localized services and network selection policy. The UE may perform an access procedure based on the selecting.

In some embodiments, the discovery information may be broadcasted in a system information block (SIB) message. The discovery information may further indicate, that the network supports providing accessing to the one or more localized services.

In some embodiments, the discovery information may be broadcasted in a SIB message. The discovery information may further indicate that the network supports on-demand access request from the UE, which or a home operator of which has no prior business relationship with the network.

In some embodiments, the discovery information may further indicate a broadcast interval to be monitored for UE to receive the further detailed information about the one or more localized services.

In some embodiments, the UE may obtain the further detailed information by monitoring during the broadcast interval to receive the further detailed information about the one or more localized services in a second SIB message based on a user input or the preconfigured localized services and network selection policy.

In some embodiments, the discovery information may further indicate that the network supports querying of the further detailed information and a query type. The query type may be one of querying with a RAN of the network, querying with a core network function of the network, or querying with an application function (AF) of a second network different from the network. The UE may obtain the further detailed information by performing, with the network, a query requesting the further detailed information about the one or more localized services and receiving a query response indicating the further detailed information about the one or more localized services.

In some embodiments, the core network function may include an access management function (AMF).

In some embodiments, the discovery information may further indicate that the network supports querying of the further detailed information and the query type broadcasted in a SIB message.

In some embodiments, the query type may be one of the querying with the RAN of the network or the querying with the core network function of the network. The UE may perform the query by transmitting the query to the RAN or an AMF via the base station.

In some embodiments, the querying with the RAN being carried out via the RAN signaling and SIB messages.

In some embodiments, the query type may be the querying with the AF of the second network. The discovery information may further indicate a server address of the AF. The UE may perform the query by transmitting the query to the AF based on the server address.

In some embodiments, the discovery information may further indicate the server address of the AF broadcasted in a SIB message, or provided to UE via a user parameter update (UPU) procedure or a user configuration update (UCU) procedure, or a policy update procedure.

In some embodiments, the AF may be an application level function that provides localized service information including a service portal.

In some embodiments, the further detailed information may include at least one of a service type of the localized service, a service name, or a service identity of the localized service. The further detailed information may further include a valid condition for accessing the localized service and the network.

In some embodiments, the valid condition for accessing the localized service and the network may include at least one of a location restriction, a time of operation, an operation time period, a moving speed, or a signaling strength.

In some embodiments, the discovery information may further include human readable information. The human readable information may be compressed or represented by pre-agreed coding translated by the UE and presented to a user of the UE.

In some embodiments, the discovery information may further include a list of localized service provider identities or a service operator group identity representing a set of service providers having business agreements with one another.

In some embodiments, the discovery information may further include a list of localized service identities or a service group identity representing the one or more localized services.

In some embodiments, the preconfigured localized services and network selection policy may be provisioned by a home network of the UE or by a localized service provider via a UPU procedure, a UCU procedure, or a policy update procedure.

In some embodiments, the network may be operated by a hosting network operator different from a home operator of the UE.

Figure 5B:
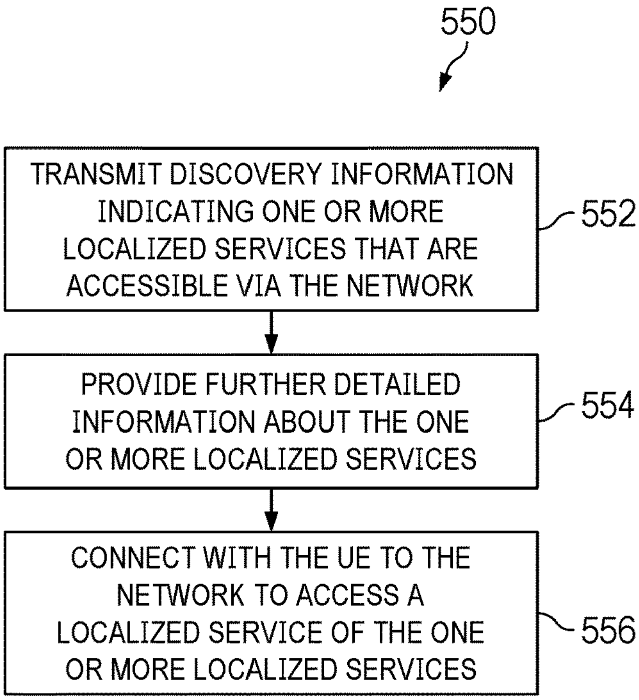
FIG. 5B illustrates a flow chart of a method for discovery and selection localized service(s), according to some embodiments.

FIG. 5B illustrates a flow chart of a method 550 for discovery and selection localized service(s), according to some embodiments. The method 550 may be carried out or performed by network device(s). The method 550 may be carried out or performed by routines, subroutines, or modules of software executed by one or more processing units. The method 550 may further be carried out or performed by hardware, software, or a combination of hardware and software. Coding of the software for carrying out or performing the method 550 is well within the scope of a person of ordinary skill in the art having regard to the present disclosure. The method 550 may include additional or fewer operations than those shown and described and may be carried out or performed in a different order. Computer-readable code or instructions of the software executable by the one or more processing units may be stored on a non-transitory computer-readable medium, such as for example, the memor(ies) of the network device(s).

The method 550 starts at operation 552, where a first network device in a network visited by a UE transmits to the UE discovery information indicating one or more localized services that are accessible via the network. At operation 554, a second network device provides to the UE further detailed information about the one or more localized services. At operation 556, the first network device connects with the UE to the network to access a localized service of the one or more localized services based on the discovery information, the further detailed information, and a preconfigured localized services and network selection policy.

In some embodiments, the first network device may be a base station, and the second network device may be another network function device different from the base station. The second network device may provide access management. The second network device may be an access management function (AMF) or an application function (AF).

In some embodiments, the first network device and the second network device may be a same base station.

In some embodiments, the localized service may be selected based on one of a manual selection by a user of the UE or a matching of the localized service in the preconfigured localized services and network selection policy. The first network device and the second network device may perform an access procedure with the UE based on the localized service selected.

In some embodiments, the discovery information may be broadcasted in a system information block (SIB) message. The discovery information may further indicate that the network supports providing accessing to the one or more localized services.

In some embodiments, the discovery information may be broadcasted in a SIB message. The discovery information may further indicate that the network supports on-demand access request from the UE, which or a home operator of which has no prior business relationship with the network.

In some embodiments, the discovery information may further indicate a broadcast interval to be monitored for UE to receive the further detailed information about the one or more localized services.

In some embodiments, the providing the detailed information may include broadcasting, by the first network device during the broadcast interval, the further detailed information about the one or more localized services in a second SIB message based on a UE input or the preconfigured localized services and network selection policy.

In some embodiments, the discovery information may further indicate that the network supports querying of the further detailed information and a query type, the query type being one of querying with a RAN of the network, querying with a core network function of the network, or querying with an AF of a second network different from the network. The providing the detailed information may include receiving, by the first network device from the UE, a query requesting the further detailed information about the one or more localized services and transmitting, by the second network device to the UE, a query response indicating the further detailed information about the one or more localized services.

In some embodiments, the core network function may include an AMF.

In some embodiments, the discovery information may further indicate that the network supports querying of the further detailed information and the query type broadcasted in a SIB message.

In some embodiments, the query type may be one of the querying with the RAN of the network or the querying with the core network function of the network. The first network device may forward the query to the RAN or an AMF.

In some embodiments, the querying with the RAN may be carried out via the RAN signaling and SIB messages.

In some embodiments, the query type may be the querying with the AF of the second network. The discovery information may further indicate a server address of the AF. The UE may transmit the query to the AF based on the server address.

In some embodiments, the discovery information may further indicate the server address of the AF broadcasted in a SIB message, or provided to UE via a user parameter update (UPU) procedure or a user configuration update (UCU) procedure, or a policy update procedure.

In some embodiments, the AF may be an application level function that provides localized service information including a service portal.

In some embodiments, the further detailed information may include at least one of a service type of the localized service, a service name, or a service identity of the localized service. The further detailed information may further include a valid condition for accessing the localized service and the network.

In some embodiments, the valid condition for accessing the localized service and the network may include at least one of a location restriction, a time of operation, an operation time period, a moving speed, or a signaling strength.

In some embodiments, the discovery information may further include human readable information. The human readable information may be compressed or represented by pre-agreed coding translated by the UE and presented to a user of the UE.

In some embodiments, the discovery information may further include a list of localized service identities or a service group identity representing the one or more localized services.

In some embodiments, the preconfigured localized services and network selection policy may be provisioned by a home network of the UE or by a localized service provider via a UPU procedure, a UCU procedure, or a policy update procedure.

In some embodiments, the network may be operated by a hosting network operator different from a home operator of the UE.

Figure 6:
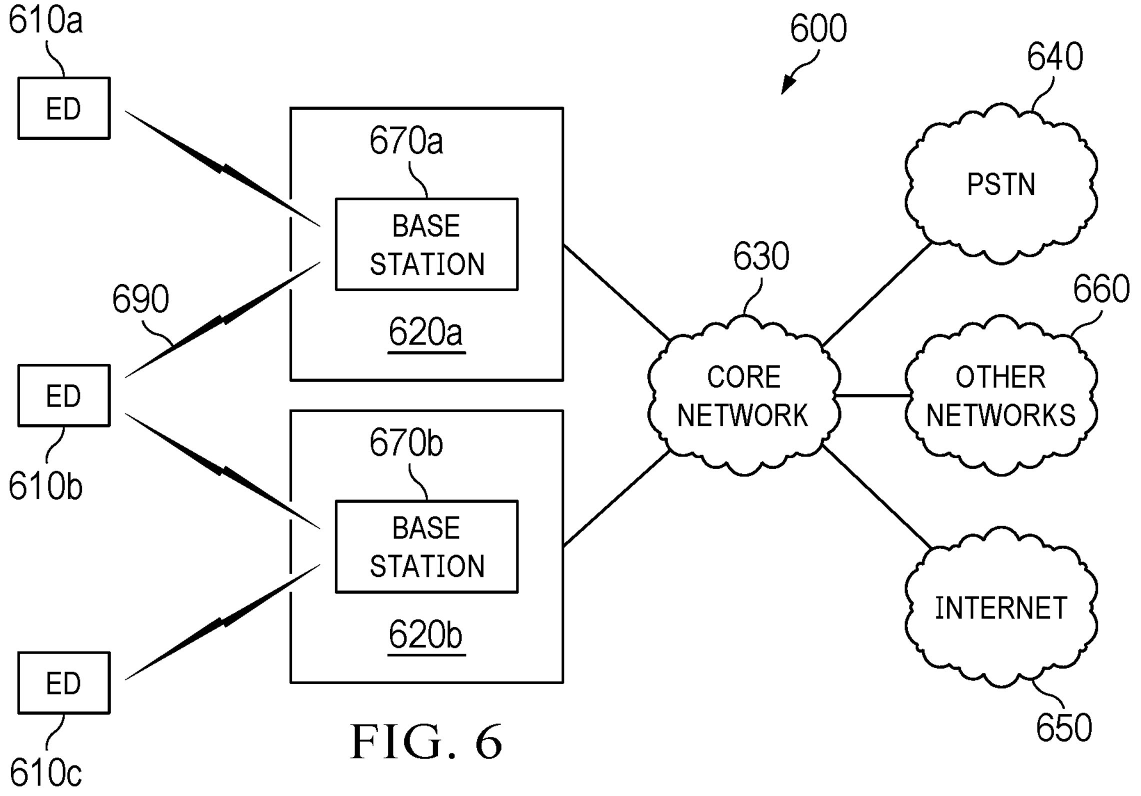
FIG. 6 is a diagram of another embodiment communication system.

FIG. 6 is a diagram of an example communication system 600. In general, the system 600 enables multiple wireless or wired users to transmit and receive data and other content. The system 600 may implement one or more channel access methods, such as code division multiple access (CDMA), time division multiple access (TDMA), frequency division multiple access (FDMA), orthogonal FDMA (OFDMA), single-carrier FDMA (SC-FDMA), or non-orthogonal multiple access (NOMA).

In this example, the communication system 600 includes electronic devices (ED) 610*a*-610*c*, radio access networks (RANs) 620*a*-620*b*, a core network 630, a public switched telephone network (PSTN) 640, the Internet 650, and other networks 660. While certain numbers of these components or elements are shown in FIG. 6, any number of these components or elements may be included in the system 600.

The EDs 610*a*-610*c* are configured to operate or communicate in the system 600. For example, the EDs 610*a*-610*c* are configured to transmit or receive via wireless or wired communication channels. Each ED 610*a*-610*c* represents any suitable end user device and may include such devices (or may be referred to) as a user equipment or device (UE), wireless transmit or receive unit (WTRU), mobile station, fixed or mobile subscriber unit, cellular telephone, personal digital assistant (PDA), smartphone, laptop, computer, touchpad, wireless sensor, or consumer electronics device.

The RANs 620*a*-620*b* here include base stations 670*a*-670*b*, respectively. Each base station 670*a*-670*b* is configured to wirelessly interface with one or more of the EDs 610*a*-610*c* to enable access to the core network 630, the PSTN 640, the Internet 650, or the other networks 660. For example, the base stations 670*a*-670*b* may include (or be) one or more of several well-known devices, such as a base transceiver station (BTS), a Node-B (NodeB), an evolved NodeB (eNodeB), a Next Generation (NG) NodeB (gNB), a Home NodeB, a Home eNodeB, a site controller, an access point (AP), or a wireless router. The EDs 610*a*-610*c* are configured to interface and communicate with the Internet 650 and may access the core network 630, the PSTN 640, or the other networks 660.

In the embodiment shown in FIG. 6, the base station 670*a* forms part of the RAN 620*a*, which may include other base stations, elements, or devices. Also, the base station 670*b* forms part of the RAN 620*b*, which may include other base stations, elements, or devices. Each base station 670*a*-670*b* operates to transmit or receive wireless signals within a particular geographic region or area, sometimes referred to as a "cell." In some embodiments, multiple-input multiple-output (MIMO) technology may be employed having multiple transceivers for each cell.

The base stations 670*a*-670*b* communicate with one or more of the EDs 610*a*-610*c* over one or more air interfaces

690 using wireless communication links. The air interfaces 690 may utilize any suitable radio access technology.

It is contemplated that the system 600 may use multiple channel access functionality, including such schemes as described above. In particular embodiments, the base stations and EDs implement 5G New Radio (NR), LTE, LTE-A, or LTE-B. Of course, other multiple access schemes and wireless protocols may be utilized.

The RANs 620*a*-620*b* are in communication with the core network 630 to provide the EDs 610*a*-610*c* with voice, data, application, Voice over Internet Protocol (VOIP), or other services. Understandably, the RANs 620*a*-620*b* or the core network 630 may be in direct or indirect communication with one or more other RANs (not shown). The core network 630 may also serve as a gateway access for other networks (such as the PSTN 640, the Internet 650, and the other networks 660). In addition, some or all of the EDs 610*a*-610*c* may include functionality for communicating with different wireless networks over different wireless links using different wireless technologies or protocols. Instead of wireless communication (or in addition thereto), the EDs may communicate via wired communication channels to a service provider or switch (not shown), and to the Internet 650.

Although FIG. 6 illustrates one example of a communication system, various changes may be made to FIG. 6. For example, the communication system 600 could include any number of EDs, base stations, networks, or other components in any suitable configuration.

Figure 7A:
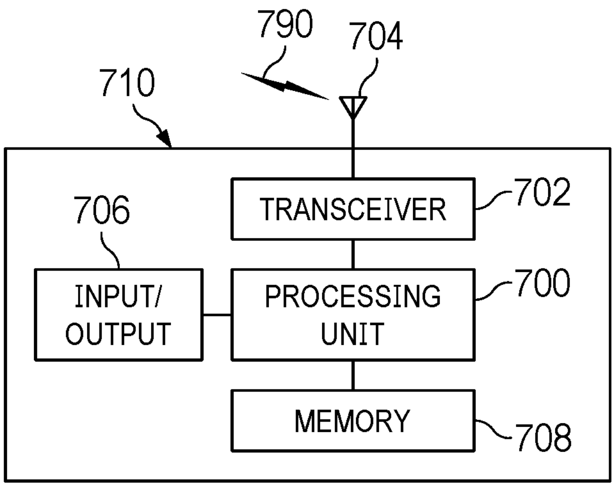
FIG. 7A is a diagram of an embodiment end device (ED)
Figure 7B:
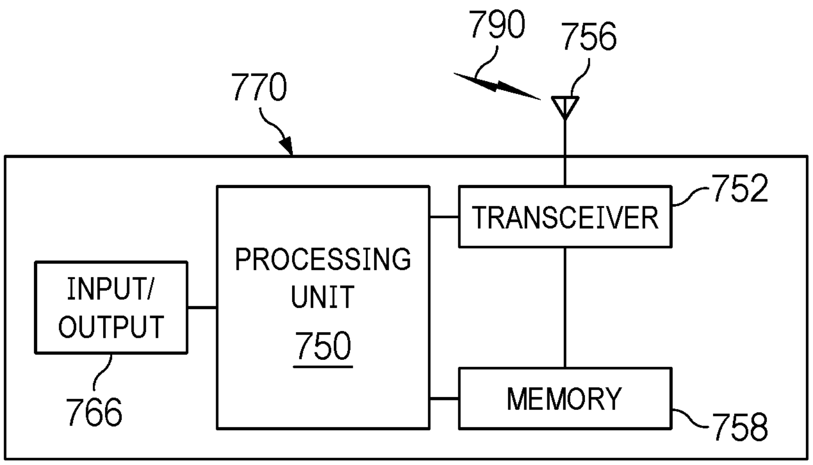
FIG. 7B is a diagram of an embodiment base station.

FIGS. 7A and 7B illustrate example devices that may implement the methods and teachings according to this disclosure. In particular, FIG. 7A illustrates an example end device (ED) or a terminal device 710, and FIG. 7B illustrates an example base station 770. These components could be used in the system 600 or in any other suitable system.

As shown in FIG. 7A, the ED 710 includes at least one processing unit 700. The processing unit 700 implements various processing operations of the ED 710. For example, the processing unit 700 could perform signal coding, data processing, power control, input/output processing, or any other functionality enabling the ED 710 to operate in the system 600. The processing unit 700 also supports the methods and teachings described in more detail above. Each processing unit 700 includes any suitable processing or computing device configured to perform one or more operations. Each processing unit 700 could, for example, include a microprocessor, microcontroller, digital signal processor, field programmable gate array, or application specific integrated circuit.

The ED 710 also includes at least one transceiver 702. The transceiver 702 is configured to modulate data or other content for transmission by at least one antenna or NIC (Network Interface Controller) 704. The transceiver 702 is also configured to demodulate data or other content received by the at least one antenna 704. Each transceiver 702 includes any suitable structure for generating signals for wireless or wired transmission or processing signals received wirelessly or by wire. Each antenna 704 includes any suitable structure for transmitting or receiving wireless or wired signals 790. One or multiple transceivers 702 could be used in the ED 710, and one or multiple antennas 704 could be used in the ED 710. Although shown as a single functional unit, a transceiver 702 could also be implemented using at least one transmitter and at least one separate receiver.

The ED 710 further includes one or more input/output devices 706 or interfaces (such as a wired interface to the Internet 650). The input/output devices 706 facilitate interaction with a user or other devices (network communications) in the network. Each input/output device 706 includes any suitable structure for providing information to or receiving information from a user, such as a speaker, microphone, keypad, keyboard, display, or touch screen, including network interface communications.

In addition, the ED 710 includes at least one memory 708. The memory 708 stores instructions and data used, generated, or collected by the ED 710. For example, the memory 708 could store software or firmware instructions executed by the processing unit(s) 700 and data used to implement the embodiment methods. Each memory 708 includes any suitable volatile or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like.

As shown in FIG. 7B, the base station 770 includes at least one processing unit 750, at least one transceiver 752, which includes functionality for a transmitter and a receiver, one or more antennas 756, at least one memory 758, and one or more input/output devices or interfaces 766. A scheduler, which would be understood by one skilled in the art, is coupled to the processing unit 750. The scheduler could be included within or operated separately from the base station 770. The processing unit 750 implements various processing operations of the base station 770, such as signal coding, data processing, power control, input/output processing, or any other functionality. The processing unit 750 can also support the methods and teachings described in more detail above. Each processing unit 750 includes any suitable processing or computing device configured to perform one or more operations. Each processing unit 750 could, for example, include a microprocessor, microcontroller, digital signal processor, field programmable gate array, or application specific integrated circuit.

Each transceiver 752 includes any suitable structure for generating signals for wireless or wired transmission to one or more EDs or other devices. Each transceiver 752 further includes any suitable structure for processing signals received wirelessly or by wire from one or more EDs or other devices. Although shown combined as a transceiver 752, a transmitter and a receiver could be separate components. Each antenna 756 includes any suitable structure for transmitting or receiving wireless or wired signals 790. While a common antenna 756 is shown here as being coupled to the transceiver 752, one or more antennas 756 could be coupled to the transceiver(s) 752, allowing separate antennas 756 to be coupled to the transmitter and the receiver if equipped as separate components. Each memory 758 includes any suitable volatile or non-volatile storage and retrieval device(s). Each input/output device 766 facilitates interaction with a user or other devices (network communications) in the network. Each input/output device 766 includes any suitable structure for providing information to or receiving/providing information from a user, including network interface communications.

Figure 8:
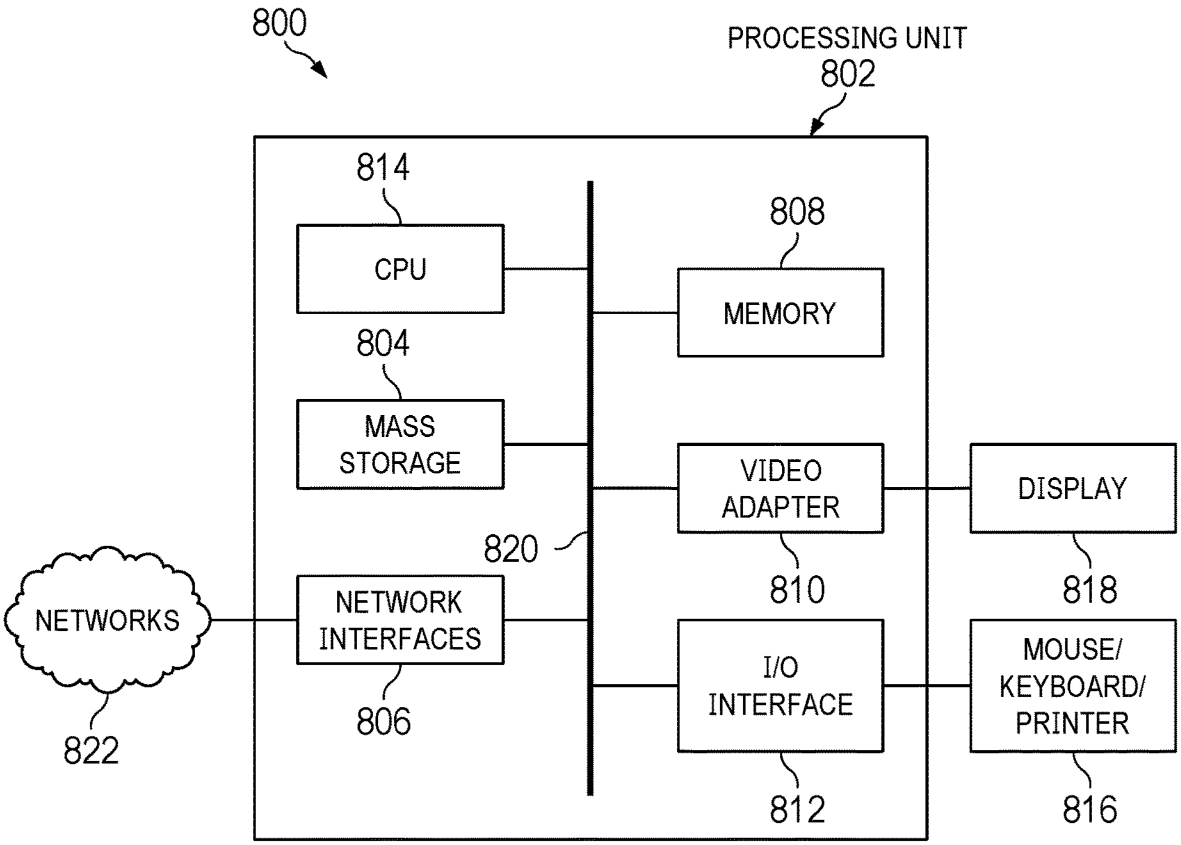
FIG. 8 is a block diagram of an embodiment computing system.

FIG. 8 is a block diagram of a computing system 800 that may be used for implementing the devices and methods disclosed herein. For example, the computing system can be any entity of UE, access network (AN), mobility management (MM), session management (SM), user plane gateway (UPGW), or access stratum (AS). Specific devices may utilize all of the components shown or only a subset of the components, and levels of integration may vary from device to device. Furthermore, a device may contain multiple instances of a component, such as multiple processing units, processors, memories, transmitters, receivers, etc. The computing system 800 includes a processing unit 802. The processing unit includes a central processing unit (CPU) 814, memory 808, and may further include a mass storage device 804, a video adapter 810, and an I/O interface 812 connected to a bus 820.

The bus 820 may be one or more of any type of several bus architectures including a memory bus or memory controller, a peripheral bus, or a video bus. The CPU 814 may comprise any type of electronic data processor. The memory 808 may comprise any type of non-transitory system memory such as static random access memory (SRAM), dynamic random access memory (DRAM), synchronous DRAM (SDRAM), read-only memory (ROM), or a combination thereof. In an embodiment, the memory 808 may include ROM for use at boot-up, and DRAM for program and data storage for use while executing programs. The memory 808 may include instructions executable by the processing unit 802.

The mass storage 804 may comprise any type of non-transitory storage device configured to store data, programs, and other information and to make the data, programs, and other information accessible via the bus 820. The mass storage 804 may comprise, for example, one or more of a solid state drive, hard disk drive, a magnetic disk drive, or an optical disk drive.

The video adapter 810 and the I/O interface 812 provide interfaces to couple external input and output devices to the processing unit 802. As illustrated, examples of input and output devices include a display 818 coupled to the video adapter 810 and a mouse, keyboard, or printer 816 coupled to the I/O interface 812. Other devices may be coupled to the processing unit 802, and additional or fewer interface cards may be utilized. For example, a serial interface such as Universal Serial Bus (USB) (not shown) may be used to provide an interface for an external device.

The processing unit 802 also includes one or more network interfaces 806, which may comprise wired links, such as an Ethernet cable, or wireless links to access nodes or different networks. The network interfaces 806 allow the processing unit 802 to communicate with remote units via the networks. For example, the network interfaces 806 may provide wireless communication via one or more transmitters/transmit antennas and one or more receivers/receive antennas. In an embodiment, the processing unit 802 is coupled to a local-area network 822 or a wide-area network for data processing and communications with remote devices, such as other processing units, the Internet, or remote storage facilities.

In some embodiments, the computing system 800 may comprise an apparatus configured to implement the embodiments of the present disclosure. The processing units 802 may execute the instructions stored in the memory 808 to cause the apparatus to perform the embodiment methods of the present disclosure.

All or some of the foregoing embodiments may be implemented by software, hardware, firmware, or any combination thereof. When software is used for implementation, the embodiments may be implemented completely or partially in a form of a computer program product. The computer program product includes one or more computer instructions. When the computer program instruction is loaded and executed on a computer, all or some of the procedures or functions are generated according to the embodiments of the present disclosure. The computer may be a general-purpose computer, a special-purpose computer, a computer network, or another programmable apparatus. The computer instruction may be stored in a computer-readable storage medium or may be transmitted from a computer-readable storage medium to another computer-readable storage medium. For example, the computer instruction may be transmitted from a website, computer, server, or data center to another website, computer, server, or data center in a wired (for example, a coaxial cable, an optical fiber, or a digital subscriber line) or wireless (for example, infrared, microwave, or the like) manner. The computer-readable non-transitory media includes all types of computer readable media, including magnetic storage media, optical storage media, flash media or solid state storage media.

It should be appreciated that one or more steps of the embodiment methods provided herein may be performed by corresponding units or modules. For example, a signal may be transmitted by a transmitting unit or a transmitting module. A signal may be received by a receiving unit or a receiving module. A signal may be processed by a processing unit or a processing module. Other steps may be performed by a determining unit/module, an obtaining unit/module, a priority updating unit/module, an indicating unit/module, a resource selecting unit/module, a resource pool partitioning unit/module, a re-evaluating unit/module, a preemption unit/module, a resource reserving unit/module, and/or a priority mapping unit/module. The respective units/modules may be hardware, software, or a combination thereof. For instance, one or more of the units/modules may be an integrated circuit, such as field programmable gate arrays (FPGAs) or application-specific integrated circuits (ASICs).

Although the description has been described in detail, it should be understood that various changes, substitutions and alterations can be made without departing from the spirit and scope of this disclosure as defined by the appended claims. Moreover, the scope of the disclosure is not intended to be limited to the particular embodiments described herein, as one of ordinary skill in the art will readily appreciate from this disclosure that processes, machines, manufacture, compositions of matter, means, methods, or steps, presently existing or later to be developed, may perform substantially the same function or achieve substantially the same result as the corresponding embodiments described herein. Accordingly, the appended claims are intended to include within their scope such processes, machines, manufacture, compositions of matter, means, methods, or steps.

What is claimed is:

1. A method comprising:

receiving, by a user equipment (UE) from a base station of a network, discovery information indicating one or more localized services that are accessible via the network, the discovery information further including a list of localized service provider identities or a list of public network service operator identities representing a set of public network service providers having business agreements with a list of localized service providers, wherein the discovery information is broadcast in a system information block (SIB) message;

determining, by the UE, to select the network based on the discovery information and a preconfigured localized services and network selection policy; and connecting, by the UE, to the network to access a localized service of the one or more localized services based on the discovery information and the preconfigured localized services and network selection policy.

2. The method of claim 1, the discovery information further including human readable information, the human readable information being compressed or represented by pre-agreed coding translated by the UE and presented to a user of the UE; and the method further comprising:

selecting, by the UE, the localized service based on a selection by the user of the UE, wherein the UE performs an access procedure based on the selecting.

3. The method of claim 1, the discovery information further indicating that the network supports querying of detailed information and a query type, the query type being one of querying with a radio access network (RAN) of the network, querying with a core network function of the network, or querying with an application function (AF) of a second network different from the network, the method further comprising:

performing, by the UE with the network, a query requesting the detailed information about the one or more localized services; and receiving, by the UE, a query response indicating the detailed information about the one or more localized services.

4. The method of claim 1, the discovery information further indicating a server address of an AF, wherein the server address of the AF is broadcasted in a SIB message, or provided to the UE via a user parameter update (UPU) procedure or a user configuration update (UCU) procedure, or a policy update procedure.

5. The method of claim 3, the detailed information including at least one of a service type of the localized service, a service name, or a service identity of the localized service.

6. The method of claim 3, the detailed information including a valid condition for accessing the localized service and the network, the valid condition including at least one of a location restriction, a time of operation, an operation time period, a moving speed, or a signaling strength.

7. The method of claim 1, the discovery information further including a service group identity representing the one or more localized services.

8. The method of claim 1, wherein the preconfigured localized services and network selection policy is provisioned by a home network of the UE or by a localized service provider via a user parameter update (UPU) procedure, a user configuration update (UCU) procedure, or a policy update procedure.

9. An apparatus, the apparatus being a user equipment (UE) or a chip system of the UE and the apparatus comprising:

a non-transitory memory storage comprising instructions; and one or more processors in communication with the non-transitory memory storage, wherein the instructions, when executed by the one or more processors, cause the apparatus to perform operations including:

receiving, from a base station of a network, discovery information indicating one or more localized services that are accessible via the network, the discovery information further including a list of localized service provider identities or a list of public network service operator identities representing a set of public network service providers having business agreements with a list of localized service providers, wherein the discovery information is broadcast in a system information block (SIB) message;

determining to select the network based on the discovery information and a preconfigured localized services and network selection policy; and connecting to the network to access a localized service of the one or more localized services based on the discovery information and the preconfigured localized services and network selection policy.

10. The apparatus of claim 9, the discovery information further indicating that the network supports querying of detailed information, the detailed information including a valid condition for accessing the localized service and the network, the valid condition including at least one of a location restriction, a time of operation, an operation time period, a moving speed, or a signaling strength.

11. The apparatus of claim 9, the discovery information further including human readable information, the human readable information being compressed or represented by pre-agreed coding translated by the UE and presented to a user of the UE; and the operations further comprising: selecting the localized service based on a selection by the user of the UE, wherein the UE performs an access procedure based on the selecting.

12. The apparatus of claim 9, wherein the preconfigured localized services and network selection policy is provisioned by a home network of the UE or by a localized service provider via a user parameter update (UPU) procedure, a user configuration update (UCU) procedure, or a policy update procedure.

13. A system comprising a user equipment (UE) and a first network device, wherein the first network device comprises at least one first processor configured to transmit, to the UE, discovery information indicating one or more localized services that are accessible via a network, the discovery information further including a list of localized service provider identities or a list of public network service operator identities representing a set of public network service providers having business agreements with a list of localized service providers, wherein the discovery information is broadcast in a system information block (SIB) message; and wherein the UE comprises at least one second processor configured to:

receive the discovery information, determine to select the network based on the discovery information and a preconfigured localized services and network selection policy; and connect to the network to access a localized service of the one or more localized services based on the discovery information and the preconfigured localized services and network selection policy.

14. The system of claim 13, wherein the discovery information further indicates that the network supports querying of detailed information, and the detailed information includes a valid condition for accessing the localized service and the network, the valid condition including at least one of a location restriction, a time of operation, an operation time period, a moving speed, or a signaling strength.

15. The system of claim 13, wherein the discovery information further includes human readable information, the human readable information being compressed or represented by pre-agreed coding translated by the UE and presented to a user of the UE; and wherein the at least one second processor is further configured to select the localized service based on a selection by the user of the UE, wherein the UE performs an access procedure based on the selecting.

16. The system of claim 13, wherein the preconfigured localized services and network selection policy is provisioned by a home network of the UE or by a localized service provider via a user parameter update (UPU) procedure, a user configuration update (UCU) procedure, or a policy update procedure.

17. The method of claim 1, the discovery information further including human readable names of the list of localized service providers.

* * * * *